United States Patent
Chang et al.

(10) Patent No.: US 8,567,979 B2
(45) Date of Patent: Oct. 29, 2013

(54) LED LENS, BACK LIGHT MODULE AND LIQUID CRYSTAL DISPLAY DEVICE

(75) Inventors: Kuang-Yao Chang, Shenzhen (CN); Hu He, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 133 days.

(21) Appl. No.: 13/322,543

(22) PCT Filed: Oct. 25, 2011

(86) PCT No.: PCT/CN2011/081296
§ 371 (c)(1),
(2), (4) Date: Nov. 25, 2011

(87) PCT Pub. No.: WO2013/053148
PCT Pub. Date: Apr. 18, 2013

(65) Prior Publication Data
US 2013/0094185 A1     Apr. 18, 2013

(30) Foreign Application Priority Data
Oct. 12, 2011   (CN) .......................... 2011 1 0308461

(51) Int. Cl.
*G09F 13/04*     (2006.01)
(52) U.S. Cl.
USPC .................... 362/97.3; 362/97.1; 362/217.02; 362/223; 362/311.01; 362/311.02
(58) Field of Classification Search
USPC ............. 362/97.1, 97.3, 217.02, 223, 311.01, 362/311.02, 317, 326, 608, 612
See application file for complete search history.

(56) References Cited

FOREIGN PATENT DOCUMENTS

CN          1763603 A        4/2006
(Continued)

OTHER PUBLICATIONS

Zhong Yanxin, the International Searching Authority written comments, May 2012, CN.

(Continued)

*Primary Examiner* — Stephen F Husar
*Assistant Examiner* — Meghan Dunwiddie
(74) *Attorney, Agent, or Firm* — IPro, Inc.; Na Xu

(57) ABSTRACT

The present invention discloses a light emitting diode (LED) lens, a back light module and a liquid crystal display (LCD) device. A LED lens is of a direct type back light module; the dispersion index of said LED lens is less than 0.1; said dispersion index is:

$$k_{dispersion} = \int_A \frac{\sum_i d_i}{d_{total}} dA;$$

dA is a microfacet of the main luminous surface of the LED blue chip; di is a solid angle of the incident angle which is just in the critical area when dA light is reflected to the lens; the critical area refers to an area in which light with different wavelengths emitted by the LED is dispersed in the lens; the total solid angle of color separation corresponding to microfacet dA is:

$$\sum_i d_i;$$

$d_{total}$ is the solid angle of the lens light emergent surface corresponding to any microfacet. The present invention can avoid dispersion phenomenon under the condition of guaranteeing wide luminance.

20 Claims, 4 Drawing Sheets

(56) References Cited

FOREIGN PATENT DOCUMENTS

| CN | 2788226 Y | 6/2006 |
| CN | 101235953 A | 8/2008 |
| CN | 100554764 C | 10/2009 |
| CN | 101482652 B | 9/2010 |
| CN | 101915391 A | 12/2010 |
| CN | 101945500 B | 6/2011 |

OTHER PUBLICATIONS

Zhang Zhongqing, the first office action, Jul. 2012, CN.

Zhang Zhongqing, the second office action, Mar. 2013, CN.

LED LENS, BACK LIGHT MODULE AND LIQUID CRYSTAL DISPLAY DEVICE

TECHNICAL FIELD

The present invention relates to the field of displays, and more particularly to a light emitting diode (LED) lens, a back light module and a liquid crystal display (LCD) device.

BACKGROUND

With the rapid growth of LED television in recent years, correlation techniques are changed quickly, and market demand is rapidly increased. Particularly, the market share of edge type LED television is continuously increased because the edge type LED television has the advantages of beautiful appearance, low cost and high benefit. However, because the corresponding optical components of the edge type LED television are not supplied in time, there is a lack of supply of light guide plates (LGPs), dual brightness enhancement films (DBEFs) and PET optical diaphragms. In addition, with the continuous expansion of the production capacity of LEDs, the problem of lack of LED light sources is already solved. Thus, adding number of LEDs and reducing dependency on optical diaphragms, LGPs and DBEFs become the focus of development of each module factory.

A direct type LED TV module does not use an LGP. The LED distribution density of the direct type LED TV module is sparser than that of an edge type LED TV module, and low power LEDs do not require special design for heat dissipation. Adding number of LEDs to remove DBEF has a positive effect on cost. Meanwhile, direct type light sources are zonally controlled, and drive control and image compensation are performed in accordance with signal sources to increase image quality. However, the direct type LED TV module has the fatal disadvantages: a certain number of LEDs must be used to avoid producing LED mura, and light-boards must be used, resulting in high cost. Although uniformity is improved, adding the height of a back light cavity causes the luminance to be reduced (as shown in FIG. 1). Therefore, how to achieve balance among low cost, high efficiency and high quality when using minimum LEDs at appropriate height of the back light cavity by the LED lens design becomes a problem of the design of LED back light at present.

SUMMARY

The aim of the present invention is to provide a LED lens, a back light module and a LCD device thereof capable of reducing the phenomenon of nonuniform colors of light emitted by LEDs and avoiding the phenomenon of dispersion under the condition of guaranteeing wide luminance.

The purpose of the present invention is achieved by the following technical schemes.

A LED lens of a direct type back light module, wherein the dispersion index of the LED lens is less than 0.1; the dispersion index is:

$$k_{dispersion} = \int_A \frac{\sum_i d_i}{d_{total}} dA;$$

wherein:

dA is a microfacet of the main luminous surface of a LED blue chip;

$d_i$ is a solid angle of the incident angle which is just in a critical area when dA light is reflected to the lens;

The critical area refers an area in which light with different wavelengths emitted by the LED is dispersed in the lens; the total solid angle of color separation corresponding to a microfacet dA is:

$$\sum_i d_i;$$

$d_{total}$ is a solid angle of the light emergent surface of the lens corresponding to any microfacet.

Preferably, the main luminous surface of the LED blue chip is a luminous surface facing the lens.

Preferably, the main luminous surface of the LED blue chip is the largest luminous surface.

Preferably, the critical area is an area (between minimum −0.3o and maximum +0.3o) which is determined on the basis that the critical angle range (minimum, maximum) of total reflection is calculated in accordance with the peak value of the light reflecting to the LED lens. A critical area range is set in accordance with the critical angle of each dominant wavelength (peak value), and preferable dispersion controlling effects are obtained when different light sources and different lens materials are used within the range.

Preferably, the lens is made of organosilicon material; the LEDs are white light LEDs; and the incident angle is a solid angle which is just in the critical area.

A direct type back light module, comprising the aforementioned LED lens of the direct type back light module.

Preferably, each column of LEDs of the back light module are fixed on one printed circuit board (PCB).

A LCD device comprises the aforementioned direct type backlight module.

Light is dispersed by using the LED lens design; theoretically, the wider the visual angle of luminance is, the more uniform the display area is. However, in fact, the LED spectrum is distributed in width, causing hidden danger of dispersion. The present invention provides a LED lens structure, so that when the dispersion index meets: $k_{dispersion} < 0.1$, the phenomenon of nonuniform colors of light emitted by LEDs is reduced, and the phenomenon of dispersion is avoided under the condition of guaranteeing wide luminance.

Wherein: 1. red light area; 2. blue light area; 3. green light area.

DETAILED DESCRIPTION

The present invention will further be described in detail in accordance with the figures and the preferred embodiments.

Figure 1:
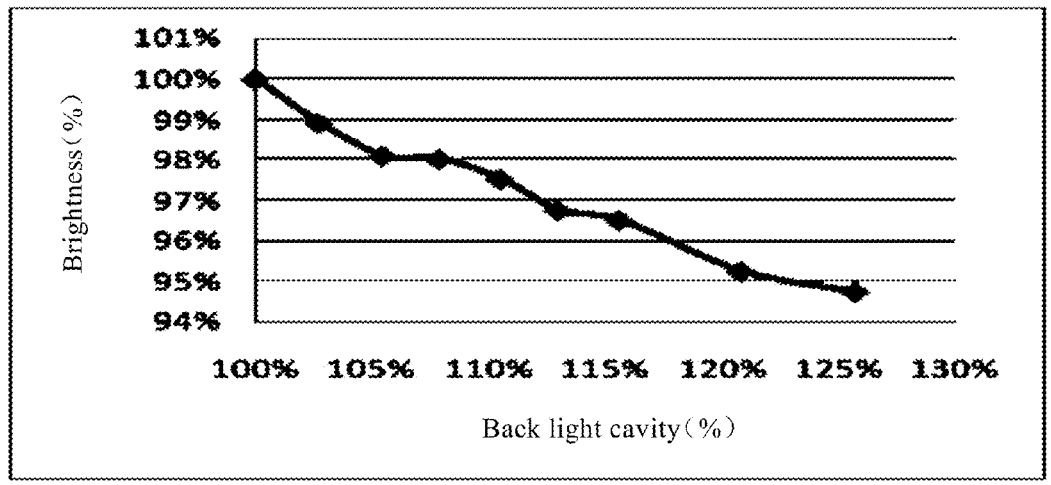
FIG. 1 is a schematic diagram of the relationship between LED brightness and a back light cavity.
Figure 2:
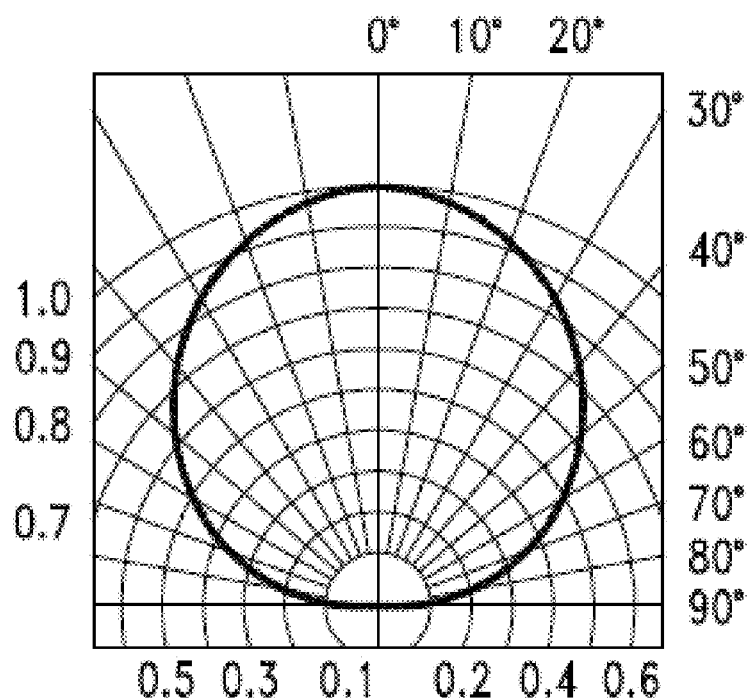
FIG. 2 is a schematic diagram of the luminance of LEDs without lens.

As shown in FIG. 2, in the LED lens design at present, LED light is dispersed to some extent by using simple principles of geometrical optics, refraction and total internal reflection, to reduce the light mixing distance of LEDs or number of LEDs.

Figure 3:
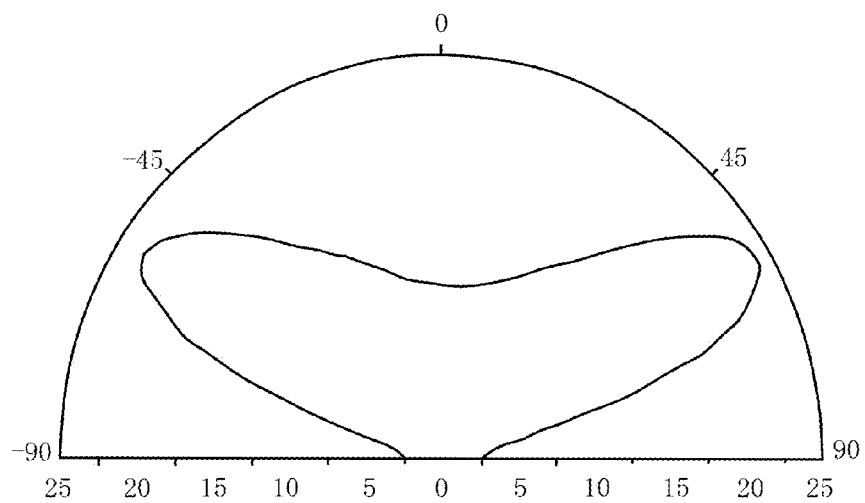
FIG. 3 is a schematic diagram of the luminance of LEDs with lens.
Figure 4:
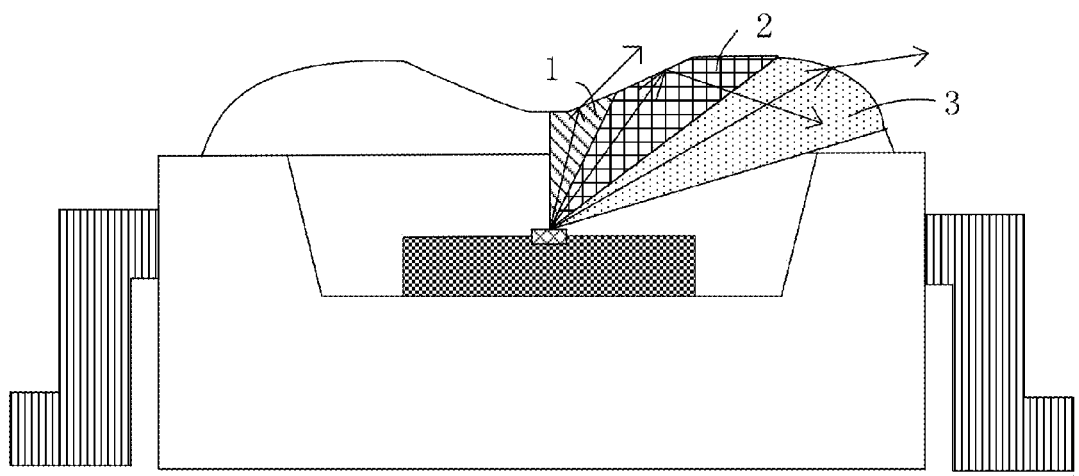
FIG. 4 is a structural diagram of LEDs with lens.
Figure 5:
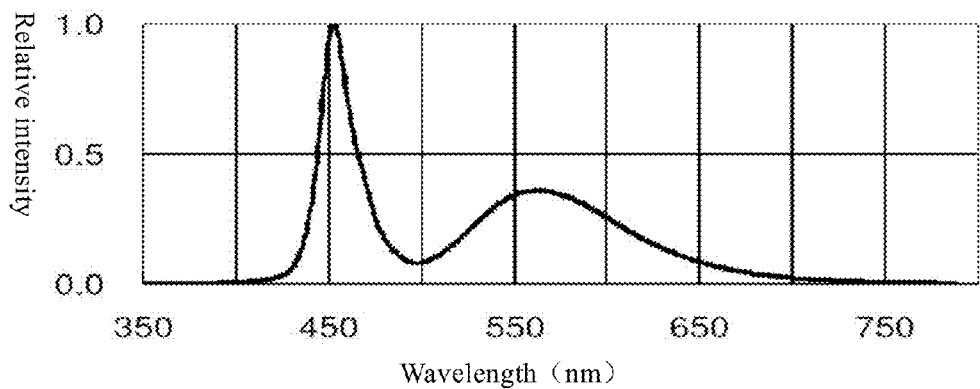
FIG. 5 is a spectrum diagram of LED white light.
Figure 6:
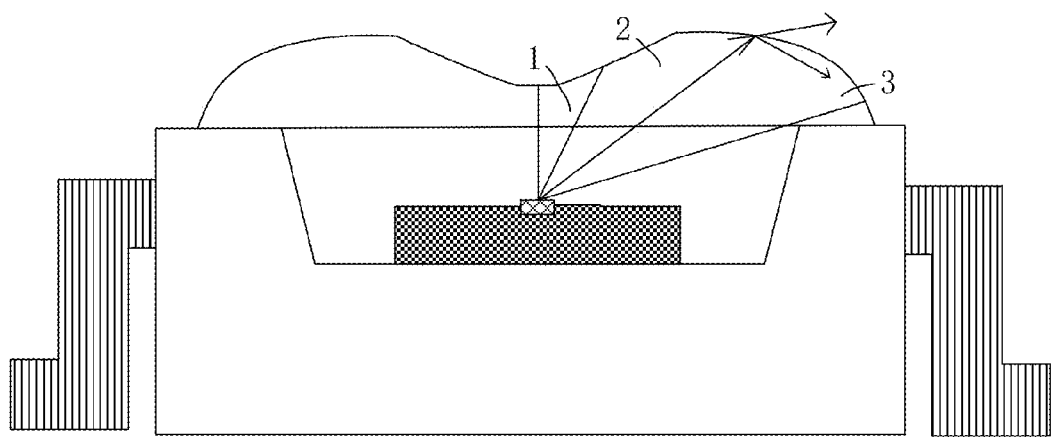
FIG. 6 is a schematic diagram of a LED dispersion phenomenon.

LEDs with lens are shown in FIG. 3 and FIG. 4. The middle part of the lens structure is hollow, and is approximately divided into three areas corresponding to LED size in accordance with a single wavelength: red light area 1, blue light area 2 and green light area 3. The LEDs of the present invention are different from the traditional SMD LEDs in that light is mostly refracted. White light LED spectrum is distributed in width (spectrum is as shown in the FIG. 5, a blue chip plus yellow fluorescent powder); plus considering that the size of the blue chip corresponding to the lens is at the same magnitude, the whole light emitting area and the thickness of the fluorescent powder must be considered, and light can not be obviously divided as shown in FIG. 5. Because the refraction angle of short wavelength light is large, the short wavelength light reaches the condition of total internal reflection in advance; and red light is easily separated from the blue light at the juncture of two areas—as shown in FIG. 6, blue light is internally and totally reflected after exceeding the blue light area 2; and red light is separated out the lens by refraction. In a direct type back light module, a LED and a display surface are spaced at an interval of a cavity; two types of light are easily separated; and a dispersion phenomenon is caused; thus, the edge of the LED light source is in the color of annular partial yellow and partial red.

Research has shown that the main reason for the phenomenon comprises the following items:

(1) A luminous spectrum in a white light LED covers a visible light wave band; for special lens material, the propagation speeds of light with different wavelengths in the lens are different; different refraction indexes occur. Take the lens made of silicone as an example; 450 nm blue light corresponds to a refractive index of 1.53359; 525 nm green light corresponds to a refractive index of 1.52281; and 650 nm red light corresponds to a refractive index of 1.51439. Namely with the increase of wavelength, the corresponding refraction index is reduced, and light curvature is reduced.

(2) In the interface between the lens and air, with the increase of the angle of incident light, total internal reflection occurs; and the critical angle of total internal reflection depends on the refraction index of material. Take the lens made of silicone as an example; 450 nm blue light corresponds to the critical angle of total reflection of 40.70°; and 650 nm red light corresponds to the critical angle of total reflection of 41.33°. Namely with the increase of wavelength, the critical angle of total reflection is increased.

Figure 9:
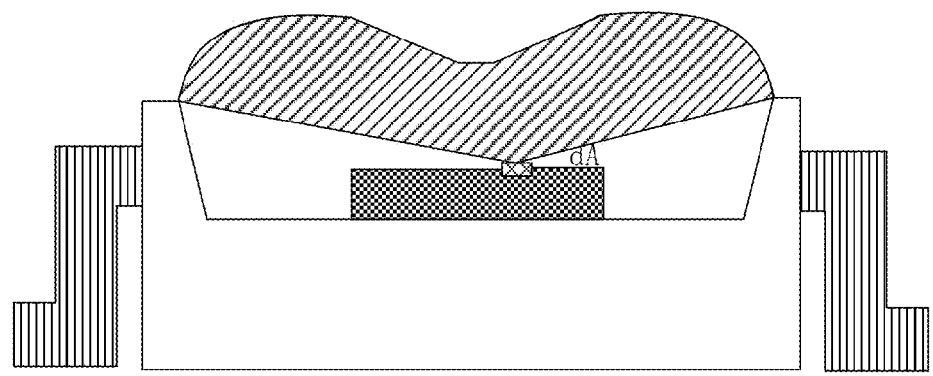
FIG. 9 is a schematic diagram of a solid angle of a light emergent surface of a LED lens corresponding to any microfacet dA.

(3) The angle of incident light is affected by a curved surface when the lens is designed, and then total internal reflection is affected. When the incident angle is within a certain range, long wavelength light is separated from short wavelength light. Light at some wavelength light is refracted, and light at some wavelength is internally and totally reflected. Thus, colors are separated. FIG. 9 shows a LED lens model. Take the LED lens made of silicone as an example; the interface has three conditions: when the incident angle meets the condition of $0<\theta<40.5°$, light of all wavelengths are refracted; when $40.5°<\theta<41.5°$, the colors in visible light wavebands are separated; long wavelength light is refracted, and short wavelength light is totally reflected; this is the main reason causing nonuniform distribution of color fields; when $\theta>41.5°$, all visible light are internally and totally reflected.

(4) Dispersion occurs on the lens interface; the light mixing distance between LEDs and a diffuser plate is effectively amplified, causing nonuniform distribution of color fields. The following table lists the blue chip(s) frequently used by white light LEDs, the dominant wavelength(s) of fluorescent powder, the refraction index(es) corresponding to silicone, and critical angle(s) of total internal reflection of light.

|       |           | Wavelength | Index | critical angle |
|-------|-----------|------------|-------|----------------|
|       | blue chip | 450        | 1.534 | 40.70          |
| Y + r | Y         | 547        | 1.521 | 41.11          |
|       | r         | 620        | 1.516 | 41.27          |
|       | Y         | 560        | 1.520 | 41.15          |
| RG_1  | R         | 630        | 1.515 | 41.29          |
|       | G         | 525        | 1.523 | 41.05          |
| RG_2  | R         | 650        | 1.514 | 41.33          |
|       | G         | 525        | 1.523 | 41.05          |

Figure 7:
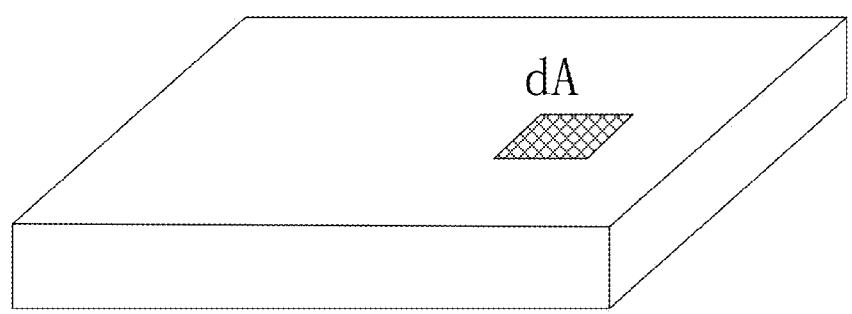
FIG. 7 is a schematic diagram of a microfacet of a LED luminous surface.
Figure 8:
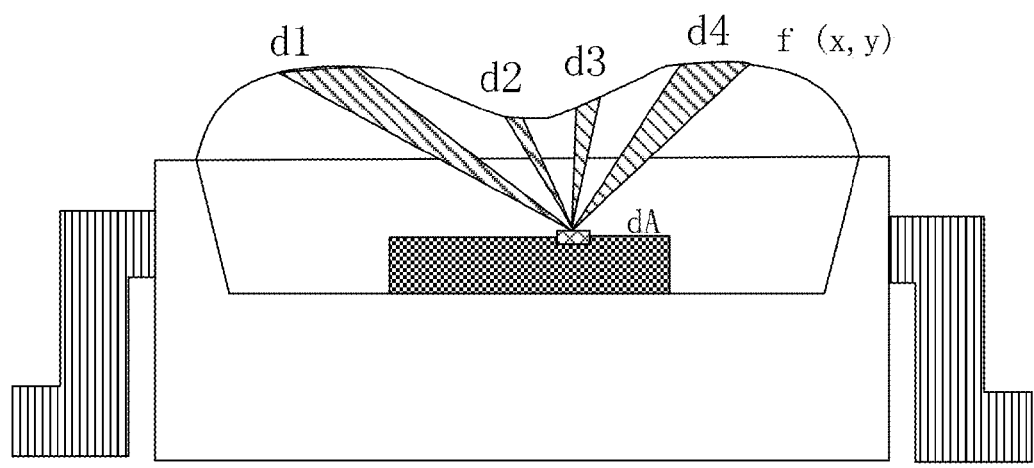
FIG. 8 is a schematic diagram of a critical area of a LED lens.

As shown in FIG. 7 to FIG. 9, in accordance with the above research, the present invention provides a LCD device, comprising: a direct type back light module; the direct type back light module comprises a LED lens of the direct type back light module, and the dispersion index of the LED lens is less than 0.1; the dispersion index is:

$$k_{dispersion} = \int_A \frac{\sum_i d_i}{d_{total}} dA$$

wherein:

dA is a microfacet of the main luminous surface of the LED blue chip;

di is a solid angle of an incident angle which is just in the critical area when dA light is reflected to the lens;

The critical area refers to an area in which light with different wavelengths emitted by the LEDs is dispersed in the lens; the total solid angle of color separation corresponding to microfacet dA is:

$$\sum_i d_i;$$

$d_{total}$ is the solid angle of the light emergent surface of the lens corresponding to any microfacet.

Furthermore, the main luminous surface of the LED blue chip is a luminous surface facing the lens.

Furthermore, the main luminous surface of the LED blue chip is the largest luminous surface.

Furthermore, the critical area is an area (between minimum −0.3o and maximum +0.3o) which is determined on the basis that the critical angle range (minimum, maximum) of total reflection is calculated in accordance with the peak value of the light reflected to the LED lens.

Furthermore, the lens is made of organosilicon material; the LEDs are white light LEDs, and the incident angle is a solid angle which is just in the critical area.

Furthermore, each column of LEDs of the back light module are fixed on one PCB. In the embodiment, only fixed LEDs and PCB(s) required for supplying the LEDs are kept. Thus, PCBs can be saved, and the cost can be reduced.

The definition of dispersion index specifies a dispersion degree; theoretically, the smaller the index is, and the better the index is. Because human eyes have certain resolution capacity, dispersion within certain range can be accepted by people. In terms of dispersion degree, the sizes of faculae are the same basically at the same diffusion height, and dispersion only exists on the periphery. Dispersion range is reduced, namely the dispersion index is reduced. Therefore, the dispersion index can be measured during lens design, so that the index can correspond to the lens actually used. If the index cannot reach a set standard during design, the designed dispersion effect cannot be accepted by average consumers.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A light emitting diode (LED) lens of a direct type back light module, a dispersion index of said LED lens is less than 0.1; said dispersion index is:

$$k_{dispersion} = \int_A \frac{\sum_i d_i}{d_{total}} dA;$$

wherein:
dA is a microfacet of the main luminous surface of an LED blue chip;
di is a solid angle of the incident angle which is just in the critical area when dA light is reflected to the lens;
said critical area refers to an area in which light with different wavelengths emitted by the LED is dispersed in the lens; the total solid angle of color separation corresponding to microfacet dA is:

$$\sum_i d_i;$$

and
$d_{total}$ is a solid angle of the light emergent surface of the lens corresponding to any microfacet dA.

2. The LED lens of the direct type back light module of claim 1, wherein the main luminous surface of the LED blue chip is a luminous surface facing the lens.

3. The LED lens of the direct type back light module of claim 1, wherein the main luminous surface of the LED blue chip is the largest luminous surface.

4. The LED lens of the direct type back light module of claim 1, wherein said critical area is an area (between minimum −0.3o and maximum +0.3o) which is determined on the basis that the critical angle range (minimum, maximum) of total reflection is calculated in accordance with the peak value of the light reflected to the LED lens.

5. The LED lens of the direct type back light module of claim 1, wherein said lens is made of organosilicon material; said LEDs are white light LEDs; and said incident angle is a solid angle which is just in the critical area.

6. A direct type back light module comprising an LED lens; a dispersion index of said LED lens is less than 0.1; said dispersion index is:

$$k_{dispersion} = \int_A \frac{\sum_i d_i}{d_{total}} dA;$$

wherein:
dA is a microfacet of the main luminous surface of an LED blue chip;
di is a solid angle of the incident angle which is just in the critical area when dA light is reflected to the lens;
said critical area refers to an area in which light with different wavelengths emitted by the LED is dispersed in the lens; the total solid angle of color separation corresponding to microfacet dA is $$\sum_i d_i;$$

and
$d_{total}$ is the solid angle of the light emergent surface of the lens corresponding to any microfacet dA.

7. The direct type back light module of claim 6, wherein the main luminous surface of said LED blue chip is a luminous surface facing the lens.

8. The direct type back light module of claim 6, wherein the main luminous surface of said LED blue chip is the largest luminous surface.

9. The direct type back light module of claim 6, wherein said critical area is an area (between minimum −0.3o and maximum +0.3o) which is determined on the basis that the critical angle range (minimum, maximum) of total reflection is calculated in accordance with the peak value of the light reflected to the LED lens.

10. The direct type back light module of claim 6, wherein said lens is made of organosilicon material; said LEDs are white light LEDs; and said incident angle is a solid angle which is just in the critical area.

11. The direct type back light module of claim 6, wherein each column of LEDs of said back light module are fixed on one printed circuit board (PCB).

12. The direct type back light module of claim 7, wherein each column of LEDs of said back light module are fixed on one PCB.

13. The direct type back light module of claim 8, wherein each column of LEDs of said back light module are fixed on one PCB.

14. The direct type back light module of claim 9, wherein each column of LEDs of said back light module are fixed on one PCB.

15. The direct type back light module of claim 10, wherein each column of LEDs of said back light module are fixed on one PCB.

16. A liquid crystal display (LCD) device comprising: a direct type back light module; said direct type backlight module comprises a LED lens; a dispersion index of said LED lens is less than 0.1; said dispersion index is:

$$k_{dispersion} = \int_A \frac{\sum_i d_i}{d_{total}} dA;$$

wherein:

dA is a microfacet of the main luminous surface of an LED blue chip;

di is a solid angle of the incident angle which is just in the critical area when dA light is reflected to the lens;

said critical area refers to an area in which light with different wavelengths emitted by the LED is dispersed in the lens; the total solid angle of color separation corresponding to microfacet dA is:

$$\sum_i d_i;$$

and $d_{total}$ is the solid angle of the light emergent surface of the lens corresponding to any microfacet dA.

17. The LCD device of claim 16, wherein the main luminous surface of said LED blue chip is a luminous surface facing the lens.

18. The LCD device of claim 16, wherein the main luminous surface of said LED blue chip is the largest luminous surface.

19. The LCD device of claim 16, wherein said critical area is an area (between minimum −0.3o and maximum +0.3o) which is determined on the basis that the critical angle range (minimum, maximum) of total reflection is calculated in accordance with the peak value of the light reflected to the LED lens.

20. The LCD device of claim 16, wherein said lens is made of organosilicon material; said LEDs are white light LEDs; and said incident angle is a solid angle which is just in the critical area.

* * * * *